United States Patent Office

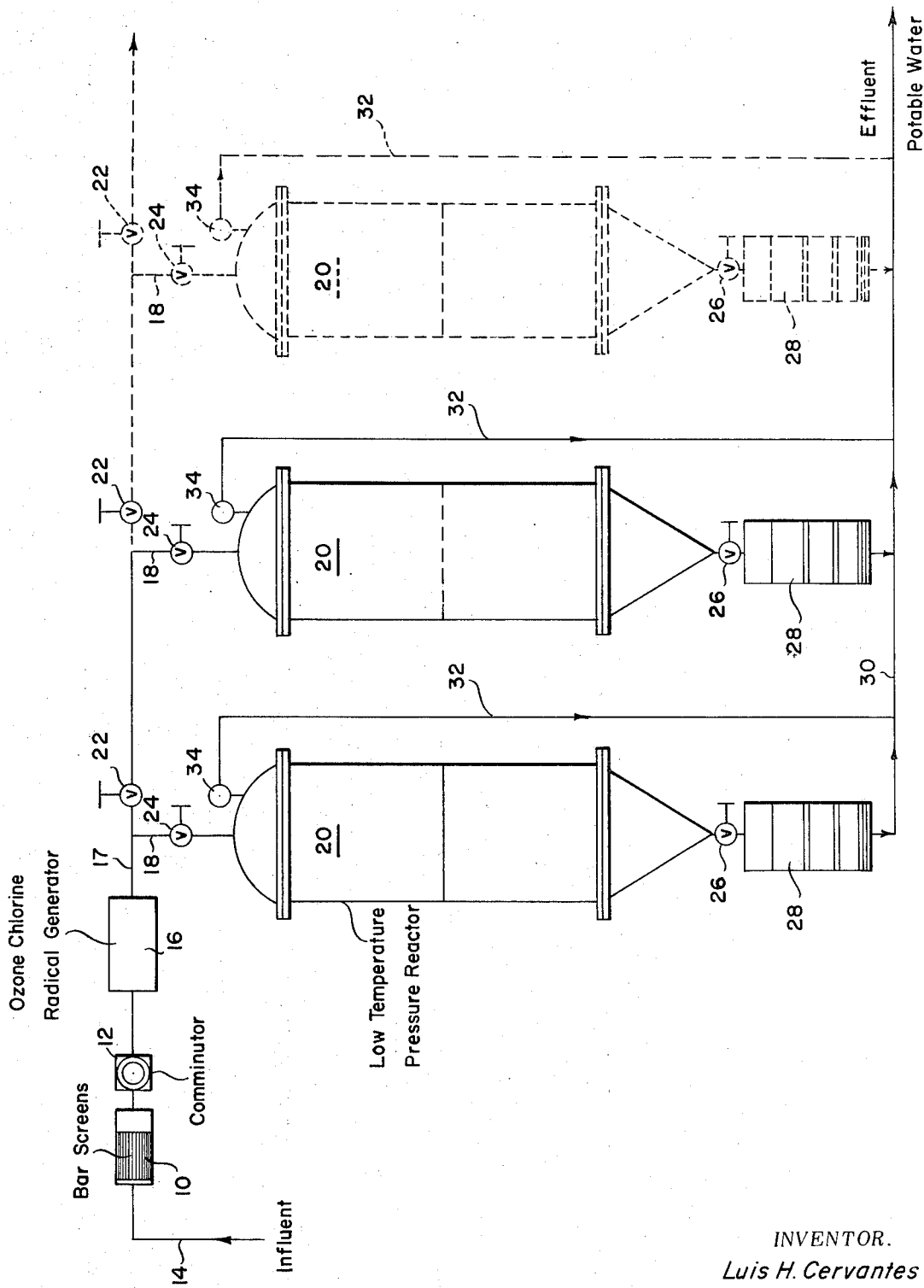

3,804,755
Patented Apr. 16, 1974

3,804,755
SEWAGE TREATMENT SYSTEM
Luis H. Cervantes, 2373 Bellwood Drive,
Pittsburgh, Pa. 15237
Filed Aug. 2, 1971, Ser. No. 167,922
Int. Cl. C02c 1/40; C02b 1/02
U.S. Cl. 210—50                                     6 Claims

ABSTRACT OF THE DISCLOSURE

A sewage treatment system wherein raw sewage is treated at relatively low temperatures and pressures to convert the same into potable effluent along with filtratable sludge suitable for fertilizer. The unique simplicity of the system renders the same economical for both institutional and community use.

---

The present invention relates to a sewage treatment system which is uniquely characterized by its simplicity and total effectiveness as compared with many known sewage treatment techniques.

With increasing urbanization and congestion of society it has become correspondingly increasingly important to develop and provide means for handling and effectively treating sewage wastes with maximum effectiveness at minimum cost. Over many years much research effort has been expended in connection with sewage handling and treatment, and which in turn has led to development of sophisticated and complex sewage treatment plants and techniques, as are commonly found in major urban areas of the world.

These many well known systems include and incorporate open pond treatment, clarification tanks, aerobic digesters, wet air oxidation processes, and activated sludge, as briefly set forth, along with numerous other techniques related thereto or derived therefrom.

These diverse techniques are effective, for the most part, but by virtue of the size and character of the equipment required have proven expensive to install and operate as well as creating their own problems as to further handling of the output effluent.

By way of example, in many instances extensive pretreatment of the raw sewage is required before the product can be handled by and within the system. In other instances and quite commonly, notably high temperatures and high pressures have been required and encountered, thereby necessitating especially designed equipment with concomitant cost factors to handle such temperature and pressure extremes in a safe manner.

Accordingly, faced with the mounting problems of sewage treatment, the demand that sewage and especially domestic sewage be treated in an effective manner with minimal nuisance to the public, and in like manner at the lowest possible effective cost, I have devised a sewage process which effects the desired and necessary community health protection, while achieving the ends aforesaid.

Specifically, the process of my invention is capable of replacing the conventional prior systems of sewage treatment, can eliminate virtually all of the bacteriological contaminants along with the suspended solids, greases and organic matter from the resulting effluent, eliminate odor and gas formation, provide an easier and less expensive sanitary engineering system which eliminates the complexity of bacterial and BOD management, and eliminate problems of water pollution presently resulting from conventional treatment systems.

My invention differs significantly in material respects from techniques as currently employed. The present invention is characterized by its relative simplicity, minimal treatment steps, low temperatures, low pressures, and resultant low costs. Perhaps most uniquely, the ultimate products comprise filter cake which is suitable for fertilizer, along with potable liquid. Thereby problems incident to sludge and sewage wastes, including odor, disposal, handling, etc. are eliminated.

These and other aspects and advantages of my invention will become apparent from the following detailed description taken in connection with the accompanying drawing.

BRIEF DESCRIPTION OF THE DRAWINGS

The single drawing is a diagrammatic illustration of the sewage treatment system of the invention from raw sewage infeed to neutralized solids and potable water discharge.

While there are slight differences in diverse geographic locales or during different calendar periods, for the most part analysis of basic domestic sewage regularly reveals that on an average less than one-tenth of one percent constitutes solid matter. Further, of this quite small solids content, one-third is carried in suspension while the remaining two-thirds solids are in solution as dissolved matter.

Continuing, of the portion comprising dissolved matter, usual analysis reveals that about one-third is organic matter and two-thirds constitutes inorganic matter. Therefore, generally speaking, of total sewage content it can usually be assumed that about one-half is organic in nature and one-half inorganic.

Defined significant constituents of the organic matter include nitrogenous materials, carbohydrates, greases, mineral oils, pathogenic organisms of high bacterial content, viruses and the like.

An average analysis of typical sewage in accordance with the foregoing might be as follows:

|   | Milligrams/liter |
|---|---|
| Total solids | 515 |
| Suspended solids | 233 |
| Free ammonia | 29 |
| Kjeldahl nitrogen | 16 |
| Chlorine | 44 |
| Alkaline | 149 |
| Fats | 65 |
| Oxygen demand | 84 |
| BOD | 184 |

With reference to the accompanying drawing, the essential components of the sewage treatment system according to the present invention include a conventional bar screen 10 and comminutor 12 which receive the raw untreated sewage from infeed or supply 14. In conventional fashion, these devices remove large or unyielding solids from the raw feed, and reduce the carried sewage solids to smaller particles thereby to maximize the surface area thereof for subsequent treatment.

Following comminution, the sewage passes through unit 16 within which chlorine and oxygen in the specific form of ozone are admixed with the sewage. Units of this character which mix chlorine and ozone within fed liquid streams are commercially available. One such unit is manufactured by Automatic Chemical Inc. of LaHabra, California, and is identified as a "Chlorozone Generator," Model I-460-12A. Such a unit, originally designed for swimming pool use, produces a neutral hypochlorite and ozone, the latter having a half life on the order of ten minutes.

Thereafter the influent sewage will pass along line 17 and branch at lines 18 into one or more pressure reactors 20 whereat the substantially single step treatment of the instant process occurs. In this regard, the primary feed line 17 includes valves 22 as well as individual reactor inlet valves 24 which are manually or automatically sequenced as set forth more fully hereinafter. The reactors 20 are heated by suitable means, such as gas combustion, to produce the requisite temperatures.

After treatment for a predetermined period within the tank 20, the now fully treated liquid and solids carried thereby pass through discharge valves 26 into a multi-stage pressure filter 28 of substantially conventional construction. In the instant diagrammatic illustration, the filter 28 is shown as of the four-stage type which serves to remove all solids from the liquid, the effluent thereafter passing through line 30 to a collected discharge. It is a feature of the present invention that the effluent at this point now comprises potable water. Any steam released during operation of the pressure reactors 20 will pass through lines 32 under control of pressure regulators 34 to be admixed with the water effluent in line 30.

With a basic understanding of the system elements thus in mind, a more complete description of the sequential functioning thereof is now set forth, whereby the unique results of the sewage treatment system can be more fully appreciated.

As indicated, the screened and comminuted sewage at 10, 12 passes into the chlorine-ozone tank 16 which effects a strong oxidation.

With the significant enrichment of the sewage with ozone from tank 16, there is present an excess of oxygen available as compared with the normal solubility thereof in water. Thus, under a pressure of 1 atmosphere, the solubility of oxygen in water ranges from 14.6 milligrams per liter at 0° C. to 7 milligrams per liter at 35° C. The pressure reactor 20, however, effects a substantial increase in oxygen solubility to approximately 51.1 milligrams per liter therein during the treatment stage of the sewage thereat, thereby utilizing the available oxygen to the fullest.

The preliminarily treated sewage is fed from tank 16 through lines 17 and 18 into one or more of the reactors 20. In the normal operation of the system, a reactor or series of reactors 20 will be operated alternately or successively. That is, depending upon the normal loads contemplated and handled by the system, one or more tanks 20 will be filled and the valves thereto at 24 closed while the treatment proceeds therein. During discharge of the treated sewage from these reactors at the completion of the holding period, succeeding or additional reactors 20 or groups thereof will be filled or will have been being filled with the sewage to the appropriate level. Thus, the reactors or reactor groups operate in alternate or successive manner whereby a continuous treatment of infed sewage is provided. It will be readily apparent that valves 22 control transfer of the initially treated influent to one or more downstream series of tanks 20, while the several valves 24 control entry into any particular tank or reactor 20.

Typically, the low temperature pressure reactor 20 will be cylindrical in nature and have a capacity of approximately 5,000 gallons. In the normal operation of the process, the reactors 20 will not be filled more than about half way, or in the illustrative example to the 2,500 gallon mark. In an actual full scale installation, of course, tank 20 will have a capacity as required for expected treatment in gallons-per-day. The treatment process is unaltered regardless of the system capacity requirements, the foregoing example being only illustrative.

The reactor head space will initially have ozone therein prior to its dissolution within the sewage as the temperature and pressure rise. In each tank 20 the temperature is increased as by the suitable heating means associated therewith to around 100° C., during the first ten minutes. During the succeeding twenty minutes, the temperature rises somewhat further to 110° C. These two holding periods constitute the entire treatment within the tanks 20, which treatment is both relatively short in time and is effected at significantly lower temperatures than commonly employed, thereby minimizing complexity and structural requirements of the system. Further, it will be seen that this relatively short treatment period maximizes utilization of the excess oxygen in its active ozone form.

During the period of treatment within the tank 20, the pressure will increase to approximately 17 atmospheres and within the Le Chatelier range for the precipitates obtained. Any developed over pressure will blow off through pressure regulating valve 34 associated with each reactor, thereby also to maintain the requisite disequilibrium.

The chemical reactions occurring within the reactors 20 under these prescribed conditions will as indicated vary within the Chatelier range relating to the irreversibility of precipitates derived from the formation of salts. With the disequilibrium condition thus maintained, the treatment within the tank is terminated after but thirty minutes.

Within reactors 20, with the chlorine and ozone enrichment as set forth, the chief reactions are found to be as follows:

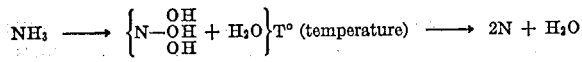

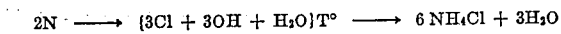

Valve 26 will then be opened, and the residual pressure in the tank 20 is advantageously utilized to expel the liquor from the tank 20 through the pressure filter 28. The approximate pressure of discharge will be on the order of 10 atmospheres and at an approximate 80° C. temperature.

The treatment within the tank 20 under the precise conditions set forth results in complete precipitation of the solid matter, whereby in passing through the pressure filter 28, all solids, suspended inerts, and colloid materials will be removed and deposited on the filter as filter cake, the resultant clear water passing through the multi-stage filter being discharged at 30.

The clear water effluent is also completely free of bacterial contaminants as a result of the pressure and temperatures utilized during the process, notwithstanding the relatively low temperature thereof.

Further, it should be noted that the pressure discharge from reactors 20 serves additionally to scour the tank during the discharge period, thereby rendering the same substantially clean for subsequent refilling at its turn in the treatment cycle.

The odor- and contamination-free solid filter cake obtained on the pressure filter may be dried conventionally and used as fertilizer.

I claim:

1. A method of treating raw sewage consisting essentially of the following steps:
   screening and comminuting the raw sewage,
   chlorinating the sewage,
   enriching the sewage with oxygen in excess of the capacity of the sewage to dissolve oxygen at the time of enrichment,
   subjecting said sewage for a predetermined time to increased temperature on the order of 100° C.–110° C. and to increased pressure up to about 17 atmospheres to obtain organic and inorganic precipitates, and
   filtering the treated sewage to separate precipitated and neutralized solids from purified effluent.

2. The method of claim 1 wherein a portion of said enrichment oxygen is provided in the form of ozone.

3. The method of claim 2 wherein said sewage is subjected to said increased temperature and pressure for a period on the order of 30 minutes.

4. The method of claim 2 wherein said increased pressure is utilized to force the treated sewage through said filtering step.

5. The method of claim 2 including the step of venting any excess pressure.

6. The method of claim 4 wherein the treated sewage is discharged toward the filter at a pressure of about 10 atmospheres and at a temperature on the order of 80° C.

References Cited

UNITED STATES PATENTS

| | | | |
|---|---|---|---|
| 3,507,788 | 4/1970 | Cole et al. | 210—63 |
| 3,276,994 | 10/1966 | Andrews | 210—63 X |
| 3,660,277 | 5/1972 | McWhirter et al. | 210—63 X |
| 3,649,534 | 3/1972 | Schotte | 210—10 X |
| 3,359,200 | 12/1967 | Gitchel et al. | 210—10 X |
| 3,296,122 | 1/1967 | Karassik et al. | 210—63 X |

JOHN ADEE, Primary Examiner

T. G. WYSE, Assistant Examiner

U.S. Cl. X.R.

210—56, 63, 71